United States Patent Office 3,338,874
Patented Aug. 29, 1967

3,338,874
EPOXY TERMINATED ORGANOPOLYSULFIDES
Albert J. Costanza, Akron, Ohio, assignor to The Goodyear Tire & Rubber Company, Akron, Ohio, a corporation of Ohio
No Drawing. Filed Dec. 9, 1963, Ser. No. 329,268
6 Claims. (Cl. 260—79)

This invention relates to a method for making epoxy terminated polymers containing sulfur interspersed in a predominately hydrocarbon backbone and to said polymers per se.

An object of this invention is to provide a method for stabilizing the cleaved product obtained by the hydrogenolitic cleaving of the copolymers of sulfur with conjugated dienes or the copolymer of sulfur, conjugated diene and mono alpha olefin, and thereby obtain a polymeric product which contains terminal epoxy groups.

The object of this invention is accomplished by taking the cleaved product obtained by the hydrogenolysis of the copolymer of sulfur with a conjugated diene either alone or in conjunction with a mono alpha olefin and reacting the cleaved product, in the presence of an inorganic base, with a reagent selected from the class consisting of epihalohydrin and glycidyl acrylate and glycidyl methacrylate.

The cleaving of the copolymers of sulfur and at least one diene alone or in conjunction with a mono alpha olefin is achieved by treating these copolymers with a solvent to cause the copolymers to swell and then treating the swollen polymers with a hydrogenolitic cleaving agent such as the alkali aluminum hydrides or a combination of metallic zinc and hydrochloric acid. The hydrogenolitic cleaving agent cleaves the sulfur-to-sulfur bonds in the groups of sulfur atoms in the polymer backbone to yield a polymeric product of lower molecular weight, usually about 500 to 10,000 and preferably 1,000 to 5,000. This lower molecular weight polymer also contains at least two mercapto groups per molecule, some monosulfide sulfur in the carbon-to-carbon chain of the cleaved polymer molecule and at least one double bond. The cleaved liquid polymers of this invention have viscosities at 25° C. of from about 20,000 to 100,000 centipoises or higher. The cleaved liquid polymer will contain at least one carbon-to-carbon double bond for each 1,000 units of molecular weight.

The copolymer of sulfur and a conjugated diene per se or of sulfur, a conjugated diene and a mono olefin can be represented by the following sulfur-hydrocarbon general formula:

$$M_a(S_xM_b)_yS_t$$

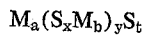

where M is a monomer unit derived from a conjugated diene having from 4 to about 8 carbon atoms, for example, butadiene, ethyl butadiene, propyl butadiene, isoprene and pentadiene-1,3, and a mono alpha olefin having from 2 to 20 carbon atoms, styrene and those cited hereinafter, S is sulfur, $a$, $b$ and $y$ are integers having values from 1 to 100 or more and with the sum of $a$, $b$ and $y$ being sufficient to give a molecule having a molecular weight of at least about 50 to 100 thousand, and $x$ and $t$ being integers having values of 0 to 8.

The hydrogenolitic cleaved $M_a(S_xM_b)_yS_t$ polymer may be represented by the following formula:

$$HSM_p(S_xM_q)_kSH$$

where M is a monomer unit obtained from a conjugated diene having from 4 to 8 carbon atoms and alpha olefins having from 2 to 20 and preferably less than 10 carbon atoms, $p$, $q$ and $k$ are integers having values of 1 and higher with the sum of $p$, $q$ and $k$ being less than those values which gives the cleaved mercaptan terminated polymer a molecular weight greater than about 10,000 and $x$ has values of from 0 to 8 with the proviso that at least some of the $x$'s have values of at least 1.

The present invention may be more fully understood from the following illustrative examples representative of the many combinations of diene monomers and mono alpha olefins which can be used to produce the cleaved polymers useful in this invention. The parts and percentages are by weight unless otherwise designated.

*Example I.—Preparation of sulfur containing polymer*

A typical polymerization recipe was as follows:

|  | Parts |
|---|---|
| Water | 200 |
| Fatty acid sodium sulfate | 4 |
| Potassium persulfate | 0.4 |
| Tetra sodium ethylene diamine tetra acetate | 0.9 |
| Iso octyl phenoxy polyethanoxy ethanol, nonionic emulsifier | 2 |
| KCl | 1 |
| Hydrochloric acid (conc.) | 0.13 |
| Sulfur | Variable |
| Isoprene | 100 |
| Hydroquinone (shortstop) | 0.15 |

Sulfur, in the form of a 35% dispersion in water, was charged after the reactor had been sealed and just prior to charging the isoprene. The reactor temperature at the start of the polymerization was 130° F. and then gradually was raised to 150° F., in 5° steps, during the first two hours of the polymerization. The shortstop was added after the desired conversion had been reached.

The latices listed below were made at the sulfur level indicated with the above recipe and procedure. The shortstop was added at the indicated conversion.

Latex 8014—Total sulfur, 4.75 parts, one-half charged initially and remainder charged at about 25% conversion. Final conversion, 70%.

Latex 8098—Total sulfur, 2 parts, charged initially. Final conversion, 65%.

Latex 8140—Total sulfur,2 parts, charged initially. Final conversion, 25%.

Latex 8257—Total sulfur, 3.99 parts, 1.33 parts charged initially and 1.33 parts charged at both 20 and 40% conversion. Final conversion, 65%.

*Example II.—Cleaving the polymer without isolating from latex*

Latex 8257, containing 100 grams of polymer was placed in a 3-liter Erlenmeyer flask equipped with a mechanically driven agitator. After starting the agitator, the following ingredients were added:

| | |
|---|---|
| Ditertiary butyl hydroquinone grams | 1 |
| Benzene ml | 1000 |
| Zinc dust grams | 50 |
| Isopropanol ml | 500 |

After 15 minutes agitation, 150 ml. of concentrated HCl was added incrementally during a period of one hour. Agitation was continued for one hour after the last addition of HCl. The reaction mixture was permitted to stand until it separated into two nearly clear liquid layers with some dark residue on the bottom of the flask. The upper layer, benzene solution containing the cleaved polymer, was separated and treated with a quantity of anhydrous sodium sulfate to remove dissolved water. Another gram of ditertiary-butyl hydroquinone, the stabilizer, was added to the benzene solution containing the cleaved polymer. Then the benzene was evaporated from the solution at room temperature to obtain 85 grams of the cleaved liquid polymer.

Analysis of the polymer indicated 4.42% by weight of mercaptan sulfur in the polymer. The dry polymer of this latex was cleaved with lithium aluminum hydride and worked up to obtain a liquid polymer, which contained 4.4% mercaptan sulfur.

*Example III*

The polymer used in this example was formed by the copolymerization of the ingredients of a recipe containing by weight about 75 parts butadiene, 25 parts styrene and 3.6 parts sulfur with the polymerization being carried to about 70% conversion. This polymer contained 4.62% sulfur and after acetone extraction the polymer was found to contain 3.72% by weight of combined sulfur. The extracted polymer (3 parts) was then treated with dry toluene (100 parts) and the mixture was allowed to stand until the polymer exhibited appreciable swelling. A solution consisting of 15 parts of tetrahydrofurane and 0.5 part of lithium aluminum hydride was added to the toluene containing the swollen polymer. The resulting mixture was shaken at frequent intervals and allowed to stand at room temperature. In a short time, about 10 minutes, a liquid phase appeared due to the cleaving of the swollen polymer. Eventually, sufficient ethyl alcohol was added slowly to the mixture to react with the total amount of lithium aluminum hydride present and thereby destroy the excess cleaving agent. The cleaved product was washed with sufficient water to remove alcohol and the other soluble components. The washed organic layer was filtered to remove any finely suspended lithium or aluminum salts. The solvent remaining in the organic phase was removed under a vacuum at room temperature. A typical analysis of the cleaved dry polymer showed the presence of 1.53% thiol sulfur.

Representative examples of the monoalpha olefins are styrene, acrylonitrile, methacrylonitrile, acrylic acid and methacrylic acid and the alkyl esters of these two acids with the alkyl radical containing from 1 to 20 carbon atoms with methacrylate and methyl methacrylate being representative examples.

The amount of the mono alpha olefin used to make the plastic or elastogenic sulfur copolymers cleavable to give the thiol polymers useful in this invention varies rather broadly from as little as about 0 mole percent to as high as about 95 mol percent of mono alpha olefins and higher. Generally the range of mono alpha olefins will be about 5 to 50 mol percent.

Some representative sulfur copolymers useful in this invention are those containing from 1 to 10% and preferably about 1.5 to 5.0% sulfur made by copolymerization with the following olefinic materials:

A. Butadiene
B. 10–90% butadiene, 90–10% styrene
C. 10–90% butadiene, 90–10% acrylonitrile
D. Isoprene
E. 10–90% isoprene, 90–10% styrene
F. 10–90% isoprene, 90–10% acrylonitrile The solvents useful in cleaving the sulfur-olefin polymers to give the thiol polymer useful in this invention are those capable of swelling the sulfur copolymer but are inert to the hydrogenolysis agents being used. When the zinc-hydrochloric acid combination is used it is necessary that some water be present, about 1 to 10% by weight, so mixtures of a water miscible and immiscible solvent such as benzene and ethanol, toluene and isopropanol, toluene and ethanol, benzene and acetic acid, or xylene and ethanol are required to promote contact by the water. When lithium aluminum hydride is used it is necessary to operate under anhydrous conditions and in the absence of compounds possessing active hydrogens such as alcohols and acids. Aromatic solvents such as benzene and toluene, etc., as well as aliphatic solvents such as hexane, heptane, cyclohexane, etc., may be used for swelling the polymers. Ethers such as tetrahydrofuran, diethylether may be used to dissolve the lithium aluminum hydride so it may be added to the swollen polymer conveniently as a solution. The preferred solvents are heptane for swelling the polymer and tetrahydrofurane for dissolving the lithium aluminum hydride.

*Example IV*

The mercaptan terminated liquid polymer used in this example was prepared by use of the cleavage procedure of Example II on a sulfur-isoprene copolymer prepared according to the procedure of Example I. 12.24 parts of the liquid thiol polymer with an equivalent weight of 965 based on its mercaptan content was dissolved in 72 parts benzene. 27.2 parts of 0.49 N alcoholic KOH (1.02 equivalents of the base/equivalent of thiol) and 3.47 parts of epichlorohydrin (2.96 equivalents/equivalent of thiol) were added. This mixture was stirred for 2 hours at room temperature before it was made slightly acid with a 3% hydrochloric acid solution. The acidified mixture was dried over anhydrous sodium sulfate centrifuged and the solvent was removed holding the mixture under a vacuum at 60° C. and 13 millimeters of mercury pressure for 16 hours. Twelve parts of a fluid polymer were recovered that had an equivalent weight of 1230 by oxirane oxygen analysis. When the liquid polymer was mixed with 8 parts tetraethylene pentamine and heated 16 hours at 95° C. in the covered dish, the resulting material was an elastic product.

Additional preparations of epoxy terminated polymers made by the procedure described above except for the conditions indicated are listed in Table 1.

TABLE 1

| Run No. | Epichlorohydrin [1] | Alcoholic KOH [1] | Reaction Conditions | | Epoxy Equivalent Weight [2] |
|---|---|---|---|---|---|
| | | | Initial Heat | Hours at 25° C. | |
| 1 | 1.05 | 1.05 | 5′ at 50° C | 24 | 1,730 |
| 2 | 1.05 | 1.05 | 90′ at 0° C | 2 | 2,860 |
| 3 | 2.0 | 1.05 | None | 2 | 1,390 |
| 4 | 2.0 | 1.5 | do | 2 | 2,840 |
| 5 | 3.0 | 1.5 | do | 2 | 1,230 |
| 6 | 3.0 | 1.02 | do | 2 | 1,750 |
| 7 | 10.0 | 1.05 | do | 2 | 1,270 |

[1] Equivalent weight of reagent per equivalent weight of polymer based on thiol content.
[2] Determined by reacting a benzene solution of the polymer with 25 ml. of a 0.5 N ethereal NCl solution and back titrating with a 0.5 N KOH solution.

Runs 1–4 employed a thiol polymer having an equivalent weight of 905. Runs 5–7 employed a thiol polymer having an equivalent weight of 965.

The equivalent weights of the epoxy product of Runs 5 and 7 and the cure data correspond to a product of the following formula:

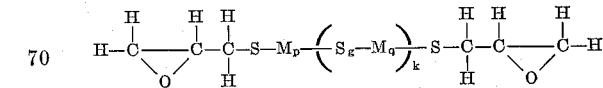

*Example V*

The epoxy polymers of Runs No. 1, 2, 3 and 5 of Example IV were mixed with various amounts of the amines shown in Table 2 and reacted to give cured polymers having the swelling volume shown in Table 2:

TABLE 2

| Epoxy polymer of Run # | Type | Percent by weight | Swelling Volume |
|---|---|---|---|
| 1 | Tetraethylene pentamine | 6 | 8 |
| 2 | ----do---- | 6.3 | 11.6 |
| 3 | Amino bis propylamine | 6 | 10.8 |
| 5 | Tetramethylene pentamine | 8 | 9.6 |

These amine cured epoxy polymers were satisfactory potting compounds and caulking materials. The mercaptan terminated polymers obtained by cleaving the butadiene-sulfur copolymers, for example, those of Example III may be treated in accordance with the procedure of Example IV to give epoxy polymers which may be cured in accordance with the procedure of this example to give a rubbery product with properties indicating it would have been a satisfactory potting composition.

*Example VI*

Five parts of a mercaptan terminated liquid polymer, obtained by cleaving a copolymer of sulfur and isoprene with lithium aluminum hydride to give a polymer having an equivalent weight from its thiol content of about 1270, was dissolved in about 18 parts of benzene containing 2 parts of 0.42 N alcoholic KOH (1% by weight KOH on polymer). Then 1.12 parts or 2.2 mols of glycidyl acrylate for each mol of the mercaptan terminated polymer was added to the benzene solution. The mixture was allowed to react at about 25° C. to 45° C. for five minutes before the mixture was made slightly acidic with ethereal hydrochloric acid. The polymer solution was centrifuged, and the solution subjected to distillation to remove the solvent. The isolated polymer had an equivalent weight of 1830 based on the epoxy content.

The isolated polymer was heated with 8% by weight of tetraethylene pentamine to obtain a rubbery product with properties indicating it would have been suitable as a potting composition.

Glycidyl methacrylate could be used instead of glycidyl acrylate in the above example except it should be anticipated that the glycidyl methacrylate reaction with the thiol would not go as fast as the glycidyl acrylate.

The reaction of the reagents, epichlorohydrin, glycidyl acrylate and glycidyl methacrylate, with the cleaved product occurs in the presence of a catalytic amount of an inorganic base such as sodium hydroxide and potassum hydroxide. Normally about 0.05 to 0.1% of the inorganic base is sufficient except with the epichlorohydrin which liberates HCl upon reaction with the cleaved product. Hence, by catalytic amount is intended sufficient inorganic base to neturalize any reactive ingredient such as HCl liberated during the reaction plus some extra to maintain the reaction medium slightly alkaline. Therefore, when epichlorohydrin is the reagent the amount of inorganic base should be in a molar excess of the amount of cleaved product.

While certain representative embodiments and details have been shown for the purpose of illustrating the invention, it will be apparent to those skilled in this art that various changes and modifications may be made therein without departing from the spirit or scope of the invention.

What is claimed is:
1. A composition of matter having the formula

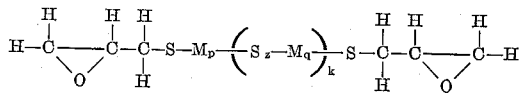

where M in a monomer unit derived from a conjugated diene having from 4 to about 8 carbon atoms and a mono alpha olefin having from 2 to about 20 carbon atoms; $p$, $q$ and $k$ are integers having values of at least 1 with their sum being less than those values which give the molecule a molecular weight no greater than about 10,000; $x$ is an integer having values of from 1 to 8.

2. The method of making the product of claim 1 comprising (1) cleaving a composition of the structure $M_a(S_xM_b)_yS_t$ where M is a monomer unit derived from a conjugated diene having from 4 to about 8 carbon atoms and a mono alpha olefin having from about 2 to about 20 carbon atoms; $a$, $b$ and $y$ are integers having values of at least 1 with their sum being sufficient to give a molecule having a molecular weight of at least 50,000; and $x$ and $t$ are integers having values of 0 to 8 with a cleaving agent selected from the group consisting of lithium aluminum hydride and a mixture of zinc and a nonoxidizing mineral acid, and (2) reacting the cleaved product with a reagent selected from the class consisting of epichlorohydrin, glycidyl acrylate and glycidyl methacrylate in the presence of a catalytic amount of inorganic base.

3. The method of claim 2 wherein the nonoxidizing mineral acid is hydrochloric.

4. The method of claim 2 wherein the reagent is epichlorohydrin and the amount of base present is at least sufficient to neutralize the HCl produced.

5. The method of claim 2 wherein the inorganic base is potassium hydroxide.

6. A method of making a composition of matter containing epoxy groups comprising reacting a cleaved product with a reagent selected from the class consisting of epichlorohydrin, glycidyl acrylate and glycidyl methacrylate in the presence of a catalytic amount of inorganic base, said cleaved product being obtained by treating a composition of the structure $M_a(S_xM_b)_yS_t$, where M is a monomer unit derived from a conjugated diene having from 4 to 8 carbon atoms and a monoalphaolefin having from 2 to about 20 carbon atoms, $a$, $b$ and $y$ are integers having values of at least one with their sum being sufficient to give a molecule having a molecular weight of at least 50,000 and $x$ and $t$ are integers having values of 0 to 8 with a cleaving agent being selected from the group consisting of lithium aluminum hydride and a mixture of zinc, and a nonoxidizing mineral acid.

References Cited

UNITED STATES PATENTS

| 2,731,437 | 1/1956 | Bender et al. | 260—79.1 |
| 2,849,416 | 8/1958 | Bender et al. | 260—79.1 |
| 3,047,544 | 7/1962 | Byrd | 260—79 |
| 3,234,188 | 2/1966 | Warner | 260—79 |

FOREIGN PATENTS 827,320   2/1960   Great Britain.

DONALD E. CZAJA, *Primary Examiner.*

LEON J. BERCOVITZ, *Examiner.*

M. I. MARQUIS, *Assistant Examiner.*